Dec. 28, 1948.　　　　D. E. CAVE　　　　2,457,444

TIE ROD END INSTALLATION

Filed Oct. 18, 1946

Inventor

DONALD E. CAVE

Patented Dec. 28, 1948

2,457,444

UNITED STATES PATENT OFFICE 2,457,444

TIE ROD END INSTALLATION

Donald E. Cave, Griffin, Ind.

Application October 18, 1946, Serial No. 704,267

2 Claims. (Cl. 287—90)

This invention relates to tie rod end installations particularly although not exclusively for automobile steering mechanisms, and a primary object of the present invention is to provide, in a tie rod end installation, a safety device which will preclude complete separation of the steering arm and the tie rod end should the bearing unit contained within the installation become broken and permit the bolt connecting the parts together to drop down, so that means is provided which keeps the parts together sufficiently securely to enable the automobile to be driven to the nearest repair station.

It is another object of the invention to provide a simple tie rod installation which is adpted to have a bearing unit therewithin, which will have a minimum number of parts while providing for the lubrication of the bearing unit and which is efficient in operation, and easy to assemble.

Figure 1:
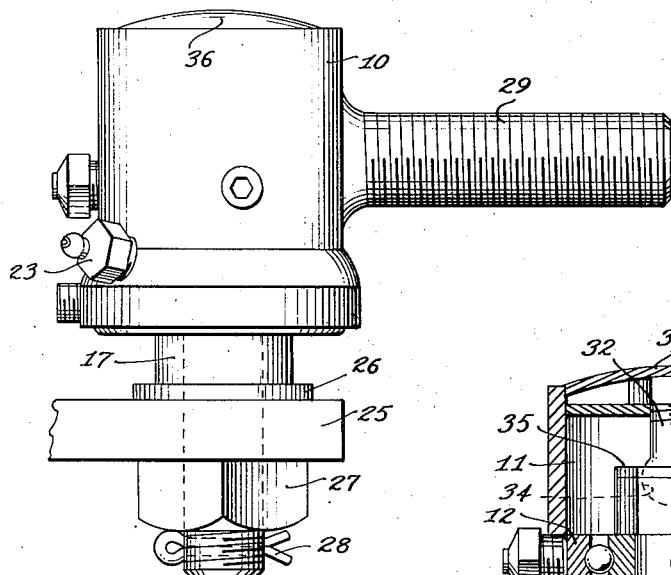
Figure 2:
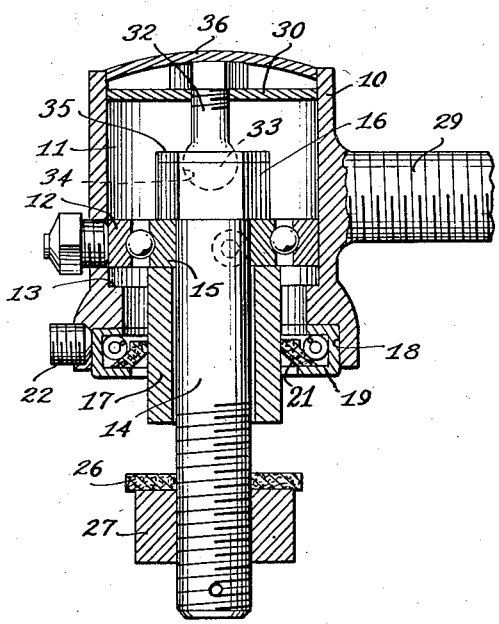
Figure 3:
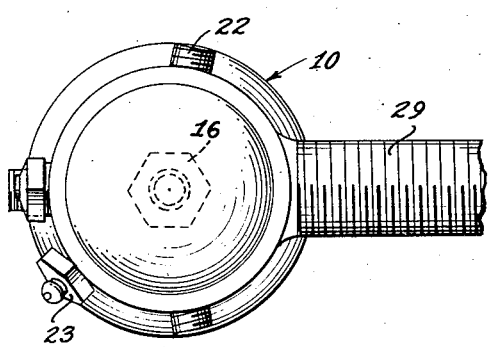

For other objects and for a better understanding of the invention, reference may be had to the following detailed description taken in connection with the accompanying drawings, in which Figure 1 is a side elevational view showing the tie rod end installation connected to a steering arm and supported thereon, Figure 2 is a transverse vertical sectional view taken through Figure 1, Figure 3 is a top plan view thereof.

Referring now to the drawings, the numeral 10 designates an inverted cup-shaped member providing a cylindrical chamber 11 in whose lower part is disposed a ball bearing unit 12 resting upon a shoulder 13 adjacent the lower end of said chamber 11. The inner race 15 of the ball bearing unit 12 is axially traversed by a connecting bolt 14 having a head portion 16 resting on the race 15. Below the inner race 15 and engaging the under face thereof there is a sleeve 17 of the bolt 14 extending downwardly through the open lower end of the cup-shaped member 10. The lower end of the cup-shaped member 10 is recessed, as indicated at 18, to receive a hollow packing ring device 19 having a flexible member 21 engaging with the exterior of the sleeve 17. This packing seal 19 is retained in the recess by a plurality of circumferentially spaced set screws 22. Grease can be inserted into the chamber 11 through an Alemite fitting 23 on the side of the member 10.

To assemble the installation, the ball bearing unit and the bolt 14 are dropped through the top of the cup-shaped member 10. Thereafter the sleeve 17 is inserted through the bottom of the member 10 and so also is the seal device 19 inserted and secured by the set screws 22. The bolt 14 then may be extended through a steering arm 25 after first placing upon the bolt a leather washer 26 and the steering arm made secure by a nut 27 and a cotter pin 28 extending transversely through the bolt shank. The tie rod itself may be connected by a sleeve coupling to a laterally extending threaded projection 29 on the exterior of the cup-shaped member 10.

In order that the bolt 14 will not be entirely disconnected from the cup-shaped member 10 should the ball bearing unit 12 become destroyed, there is provided a safety device which will prohibit the complete disunion of the bolt 14 from the cup-shaped member. This safety device comprises a washer 30 of the same diameter as the interior of the cup-shaped member 10 and a nut and bolt means 32 for securing the washer to the head 16 of the bolt 14. This bolt means has a rounded head portion 33 which is fitted into a socket opening 34 in the top of the head 16 and is retained therein by a washer-like plate 35 welded or otherwise secured to the head 16. Should the parts within the cup-shaped member 10 be broken and the bolt drop downwardly it will be retained in the cup-shaped member by the engagement of the washer 30 with the shoulder 13 near the bottom of the cup-shaped member. Thus the assembly within the cup-shaped member will be prevented from being entirely severed from the cup-shaped member. Even though the connection will thus be loosened it will be such as to permit the driver of the automobile to take the automobile to the next repair station by driving carefully.

In the top of the cup-shaped member 10 there is fixed a cover or freeze plug 36.

While various changes may be made in the detailed construction it shall be understood that such changes shall be within the spirit and scope of the present invention as defined by the appended claims.

Having thus described the invention, I claim:

1. A tie rod end comprising an inverted cup-shaped housing open at its lower end and formed intermediate its upper and lower ends with an internal shoulder, a ball bearing unit axially arranged above said internal shoulder with its outer race engaging the interior of said housing, a bolt axially depending through the inner race of said ball bearing unit and reaching below the open lower end of said housing, said bolt having a head on its upper end resting upon said inner bearing race, said head being formed with an upwardly facing ball socket, a ball therein having an upwardly extending shank, a washer spaced above said bolt head to which said shank is secured whereby said bolt is supportably connected to said washer, said washer being larger in diameter than said internal shoulder whereby upon disintegration of said ball bearing unit and consequent fall of said bolt said washer will be supported by said internal shoulder in a manner to prevent said bolt from falling through the open lower end of said housing.

2. At tie rod end comprising a vertical cylindrical housing having an open lower end, an internal shoulder formed in the lower part of said housing, a ball bearing comprising an outer race and an inner race, means securing said outer race in said housing in spaced relation above said internal shoulder, a bolt depending axially through said inner race and extending through and below the open lower end of said housing, said bolt having a head on its upper end supportably resting upon said inner race, said head having an upwardly opening ball socket, a ball confined in said socket having an upwardly projecting shank, a washer positioned in said housing above said bolt head and loosely fitting the interior of said housing, means securing said washer to said shank, whereby upon disintegration of said inner race accompanied by falling of said bolt said washer will subside in said housing and supportably rest upon said outer bearing race, and whereby upon disintegration of said outer bearing race said washer will subside in said housing and supportably rest upon said internal shoulder, in such manner as to prevent said bolt from falling through the open lower end of said housing.

DONALD E. CAVE.

REFERENCES CITED

The following references are of record in the file of this patent:

UNITED STATES PATENTS

| Number | Name | Date |
|---|---|---|
| 1,465,140 | Lumsden | Aug. 14, 1923 |
| 2,070,051 | Hufferd | Fed. 9, 1937 |
| 2,071,341 | Hufferd | Feb. 23, 1937 |
| 2,396,151 | Brenner | Mar. 5, 1946 |